(12) United States Patent
Sung et al.

(10) Patent No.: US 8,982,115 B2
(45) Date of Patent: Mar. 17, 2015

(54) LIQUID CRYSTAL DISPLAY DEVICE HAVING DISCHARGE CIRCUIT AND METHOD OF DRIVING THEREOF

(71) Applicant: LG Display Co., Ltd., Seoul (KR)

(72) Inventors: ChangYong Sung, Gumi-Si (KR); SungJoon Moon, Seoul (KR); SeYeon Kim, Seoul (KR); SeongHun Choi, Paju-Si (KR)

(73) Assignee: LG Display Co., Ltd., Seoul (KR)

( * ) Notice: Subject to any disclaimer, the term of this patent is extended or adjusted under 35 U.S.C. 154(b) by 173 days.

(21) Appl. No.: 13/712,750

(22) Filed: Dec. 12, 2012

(65) Prior Publication Data

US 2013/0147697 A1   Jun. 13, 2013

(30) Foreign Application Priority Data

Dec. 13, 2011   (KR) ......................... 10-2011-0133685

(51) Int. Cl.
*G09G 3/36*     (2006.01)
*G02F 1/1362*   (2006.01)
*G02F 1/1368*   (2006.01)

(52) U.S. Cl.
CPC ........ *G02F 1/136204* (2013.01); *G02F 1/1368* (2013.01); *G09G 3/36* (2013.01); *G09G 3/3648* (2013.01); *G09G 3/3674* (2013.01); *G09G 2310/0245* (2013.01); *G09G 2330/04* (2013.01)
USPC ............... 345/213; 345/100; 345/87

(58) Field of Classification Search
None
See application file for complete search history.

(56) References Cited

U.S. PATENT DOCUMENTS

| 2004/0164929 A1 | 8/2004 | Ide et al. | |
| 2006/0289893 A1* | 12/2006 | Lee et al. | 257/147 |
| 2008/0143659 A1* | 6/2008 | Ma | 345/87 |
| 2008/0180429 A1 | 7/2008 | Park et al. | |
| 2008/0238327 A1* | 10/2008 | Cho et al. | 315/169.3 |
| 2009/0309824 A1* | 12/2009 | Kwon et al. | 345/98 |

(Continued)

FOREIGN PATENT DOCUMENTS

| CN | 1472717 A | 2/2004 |
| CN | 101101385 A | 1/2008 |

(Continued)

OTHER PUBLICATIONS

State Intellectual Property Office of the People's Republic of China, Chinese Patent Application No. 201210539134.1, Aug. 27, 2014, sixteen pages.

(Continued)

*Primary Examiner* — Nicholas Lee
*Assistant Examiner* — Duane N Taylor, Jr.
(74) *Attorney, Agent, or Firm* — Fenwick & West LLP

(57) ABSTRACT

A liquid crystal display device discharges residual charge within the liquid crystal display panel. The liquid crystal display device comprises pixels defined by gate lines and data lines intersecting with each other and switching elements for driving the plurality of pixels; a level shifter comprising a first transistor connected between a gate-on voltage terminal and an output terminal and a second transistor connected between a gate-off voltage terminal and the output terminal to selectively output either the gate-on voltage or gate-off voltage to the plurality of gate lines; and a discharge circuit forming a discharge path connecting the gate-off voltage terminal and the ground terminal. The second transistor is turned on during the power-on of the liquid crystal display panel to apply the gate-off voltage. The discharge circuit is turned on to discharge the residual charge of the liquid crystal display panel through the discharge path.

15 Claims, 8 Drawing Sheets

(56) References Cited

U.S. PATENT DOCUMENTS

2010/0149165 A1  6/2010  Nagase et al.
2010/0182305 A1* 7/2010  Fang et al. .................... 345/212

FOREIGN PATENT DOCUMENTS

| CN | 101546096 A | 9/2009 |
| CN | 102110417 A | 6/2011 |
| KR | 10-2008-0101556 A | 11/2008 |
| KR | 10-2009-0015404 A | 2/2009 |
| TW | 201028984 A1 | 8/2010 |

OTHER PUBLICATIONS

Taiwan Patent Office, Office Action, Taiwanese Patent Application No. 10114697.1, Sep. 2, 2014, ten pages.

* cited by examiner

LIQUID CRYSTAL DISPLAY DEVICE HAVING DISCHARGE CIRCUIT AND METHOD OF DRIVING THEREOF

CROSS-REFERENCE TO RELATED APPLICATIONS

This application claims the benefit of Korean Patent Application No. 10-2011-0133685, filed on Dec. 13, 2011, which is hereby incorporated by reference for all purposes as if fully set forth herein.

BACKGROUND OF THE INVENTION

1. Field of the Invention

The present invention relates to a liquid crystal display device and method of driving the same, and more particularly, to a liquid crystal display device and method of driving the same for removing the effect of residual charge when turning on the liquid crystal display panel.

2. Description of the Related Art

In general, a liquid crystal display device is a display device for generating image information to pixels arranged in a matrix form, and adjusting the optical transmittance of the pixels to display desired images. Accordingly, the liquid crystal display device may include a liquid crystal display panel in which pixels (i.e., the minimum units for displaying an image) are arranged in an active matrix form between the pixel electrode and the common electrode, and a driving unit for driving the liquid crystal display panel. Furthermore, the liquid crystal display device may include a backlight unit for supplying light to the liquid crystal display device because it is unable to spontaneously emit light.

FIG. 1 is a schematic block diagram illustrating a liquid crystal display device. As illustrated in FIG. 1, a liquid crystal display device may include a liquid crystal display panel 10 for displaying an image, a power supply unit 50, a timing controller 40 for outputting a gate control signal and a data control signal controlling the liquid crystal display panel 10 based on an external signal, a gate driving unit 20 for outputting a gate driving voltage to the liquid crystal display panel 10, a data driving unit 30 for outputting a data voltage to the liquid crystal display panel 10, and a discharge circuit 60 for discharging the residual charge of the pixel.

For the liquid crystal display panel 10, a plurality of pixels are disposed in a matrix form by gate lines (GLs) formed in one direction on the substrate, and data lines (DLs) intersecting with the gate lines (GLs). Furthermore, a thin-film transistor (TFT), which is a switching element connected to the liquid crystal capacitor (Clc) and storage capacitor (Cst), is provided for each of the pixels.

The power supply unit 50 generates a plurality of driving voltages and a common voltage (Vcom) for driving the timing controller 40, gate driving unit 20, data driving unit 30, and liquid crystal display panel 10. Particularly, the power voltage (VCC), gate-on voltage (VGH) and gate-off voltage (VGL) are supplied to the gate driving unit 20, and the power voltage (VCC), driving voltage (VDD) and gamma voltage (GMA) to the data driving unit 30, and the power voltage (VCC) and gate-on voltage (VGH) to the discharge circuit 60.

The timing controller 40 generates a gate control signal and a data control signal based on an input external signal to output them to the gate driving unit 20 and data driving unit 30, respectively.

The gate driving unit 20 applies the gate-on voltage (VGH) and gate-off voltage (VGL) to the gate line (GL), respectively, in correspondence to the gate control signal to turn on thin-film transistors on the same horizontal line for a period of time during which the gate-on voltage (VGH) is applied.

The data driving unit 30 applies a data voltage to the data line (DL) in correspondence to the data control signal, and the data voltage is applied to each pixel through the turned-on thin-film transistor (TFT).

At this time, a charge corresponding to the data voltage is charged to the liquid crystal capacitor (Clc). Furthermore, the storage capacitor (Cst) is charged along with the liquid crystal capacitor (Clc) to perform the role of reducing the voltage drop of the liquid crystal capacitor (Clc) due to a leakage current during the turn-off of the thin-film transistor (TFT).

The discharge circuit 60 senses the power-on/off state of the system, and accordingly supplies a discharge signal to the liquid crystal display panel 10, and to this end, the discharge circuit 60 is connected to an output end of the power supply unit 50 and the gate line (GL).

Here, the power-off state denotes a state that a plurality of voltages being output from the power supply unit 50 are not supplied and the potential is changed to a level of the ground voltage after a predetermined period of time has passed. More specifically, the discharge circuit 60 is not operated when the system is in a power-on state, and supplies a discharge signal generated by the gate-on voltage (VGH) supplied from the power supply unit 50 to the liquid crystal display panel 10 when in a power-off state. Furthermore, the discharge signal is supplied to the liquid crystal display panel 10 through the gate line (GL) to turn of the thin-film transistor (TFT).

Accordingly, charge stored in the liquid crystal capacitor (Clc) and storage capacitor (Cst) is discharged through the data line (DL) as a discharge path to more speedily remove residual images displayed on the liquid crystal display panel 10.

Most of residual charges are discharged through the data line (DL) in a power-off state. But some undischarged residual charges may be stored in a plurality of pixels, and the residual charges may also remain in the gate line (GL) and thin-film transistor (TFT) without being discharged due to the characteristics of the gate line (GL) and thin-film transistor (TFT) containing a capacitor component.

Therefore, when the liquid crystal display panel 10 is turned on, the residual charges may be discharged to the gate driving unit 20 through the gate line (GL). At this time, the residual charges flow to a level shifter of the gate driving unit 20. Meanwhile, the level shifter outputs a gate-off voltage (VGL) to the liquid crystal display panel 10 when turning on the liquid crystal display panel 10, and thus a current path connected from the level shifter to the gate-off voltage terminal is conducted. Accordingly, the residual charges are discharged to the gate-off voltage terminal through the level shifter. The residual charges are charged to a capacitor connected to the gate-off voltage terminal, and thus a potential difference between both capacitor ends is increased, thereby turning on a diode connected to the capacitor in parallel. At this time, the diode is connected to the ground terminal, and thus the residual charge is discharged in the direction of the diode to generate a leakage current.

The leakage current may create a short circuit on a path through which the gate-off voltage (VGL) is applied to the liquid crystal display panel 10. In this case, the potential of the gate-off voltage (VGL) is increased, and thus the thin-film transistor within the liquid crystal display panel 10 to which the gate-off voltage (VGL) is applied may enter an abnormal operation range. As a result, each pixel of the liquid crystal display panel 10 may not be driven in a proper manner, thereby causing screen display failure.

SUMMARY OF THE INVENTION

In order to solve the foregoing problem, an object of the embodiments of the present invention is to discharge residual charge flowing from the liquid crystal display panel to the gate driving unit through the discharge circuit when turning on the liquid crystal display panel.

Furthermore, other objects and features of the present invention will be described in the configuration of the invention and claims which follow hereinbelow.

In order to accomplish the task of the present invention, a liquid crystal display device according to an embodiment of the present invention may include a liquid crystal display panel comprising a plurality of pixels defined by a plurality of gate lines and a plurality of data lines intersecting with each other and switching elements for driving the plurality of pixels; a level shifter comprising a first transistor connected between a gate-on voltage terminal and an output terminal and a second transistor connected between a gate-off voltage terminal and the output terminal to selectively output either one of the gate-on voltage or gate-off voltage to the plurality of gate lines; and a discharge circuit configured to form a first discharge path connecting the gate-off voltage terminal and the ground terminal. The second transistor is turned on during the power-on of the liquid crystal display panel to apply the gate-off voltage, and the discharge circuit is turned on to discharge the residual charge of the liquid crystal display panel through the first discharge path.

Preferably, the residual charge may be a charge stored in the plurality of pixels and the gate line during the power-off of the liquid crystal display panel.

Furthermore, the discharge circuit may conduct the first discharge path to discharge the residual charge and then open the first discharge path.

Furthermore, the discharge circuit may compare an enable signal the potential of which is linearly increased from a time point at which the liquid crystal display panel is powered on with a reference voltage, and conduct the first discharge path to discharge residual charge when the potential of the enable signal is lower than the potential of the reference voltage, and open the first discharge path when the potential of the enable signal is higher than the potential of the reference voltage.

Furthermore, the discharge circuit may include an enable signal generator configured to generate the enable signal; a comparator configured to receive the enable signal and the reference voltage to output a logical value "1" when the potential of the enable signal is lower than the potential of the reference voltage and output a logical value "0" when the potential of the enable signal is higher than the potential of the reference voltage; and a third transistor configured to conduct the first discharge path upon receiving the logical value "1" and open the first discharge path upon receiving the logical value "0".

Furthermore, the comparator may be configured with a differential amplifier to receive the enable signal at a non-inverting terminal thereof and receive the reference voltage at an inverting terminal thereof, and output a logical value to the third transistor.

Furthermore, a gate electrode of the third transistor may be connected to an output terminal of the comparator, and a source electrode thereof may be connected to the gate-off voltage terminal, and a drain electrode thereof may be connected to the ground terminal.

Furthermore, the discharge circuit may further include a first diode connected to the third transistor in series.

Furthermore, the turn-on voltage of the first diode may be 0.3 V.

Furthermore, the liquid crystal display device may further include a capacitor connected between the gate-off terminal and the ground terminal.

Furthermore, the liquid crystal display device may further include a second diode connected to the capacitor in parallel to form a second discharge path.

Furthermore, the discharge circuit may be included within the level shifter.

On the other hand, according to another embodiment of the present invention, there is provided a method of driving a liquid crystal display device including a liquid crystal display panel including a plurality of pixels defined by a plurality of gate lines and a plurality of data lines intersecting with each other; a level shifter comprising a first transistor connected between a gate-on voltage terminal and the gate line and a second transistor connected between a gate-off voltage terminal and the gate line; and a discharge circuit configured to form a first discharge path connecting the gate-off voltage terminal and the ground terminal, and the method may include applying power to the liquid crystal display panel; turning on the second transistor to conduct a current path for applying a gate-off voltage to the gate line; forming the first discharge path connected to the current path; discharging the residual charge of the liquid crystal display panel through the first discharge path and the current path; and applying the gate-off voltage to the liquid crystal display panel.

Preferably, the method may further include opening the first discharge path subsequent to discharging the residual charge.

Furthermore, said conducting the first discharge path may include comparing an enable signal having potential that is linearly increased from a time point at which power is applied to the liquid crystal display panel with a reference voltage; generating a first control signal when the potential of the enable signal is lower than that of the reference voltage; and conducting the first discharge path based on the first control signal.

Furthermore, said opening the first discharge path may include comparing an enable signal the potential of which is linearly increased from a time point at which power is applied to the liquid crystal display panel with a reference voltage; generating a second control signal when the potential of the enable signal is higher than that of the reference voltage; and opening the first discharge path based on the second control signal.

Furthermore, the method may further include forming a second discharge path connected to the current path and connected to the first discharge path in parallel while at the same time forming the first discharge path; and discharging the residual charge through the second discharge path.

According to a liquid crystal display device having the foregoing configuration and a method of driving the same associated with at least one embodiment of the present invention, residual charge flowing from the liquid crystal display panel to the gate driving unit when turning on the liquid crystal display panel may be discharged, thereby preventing the potential of the gate-off voltage applied to the liquid crystal display panel from being increased.

Accordingly, the level shifter may output a normal gate-off voltage, and the thin-film transistor may be stably operated, thereby removing screen display failure.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Figure 1:
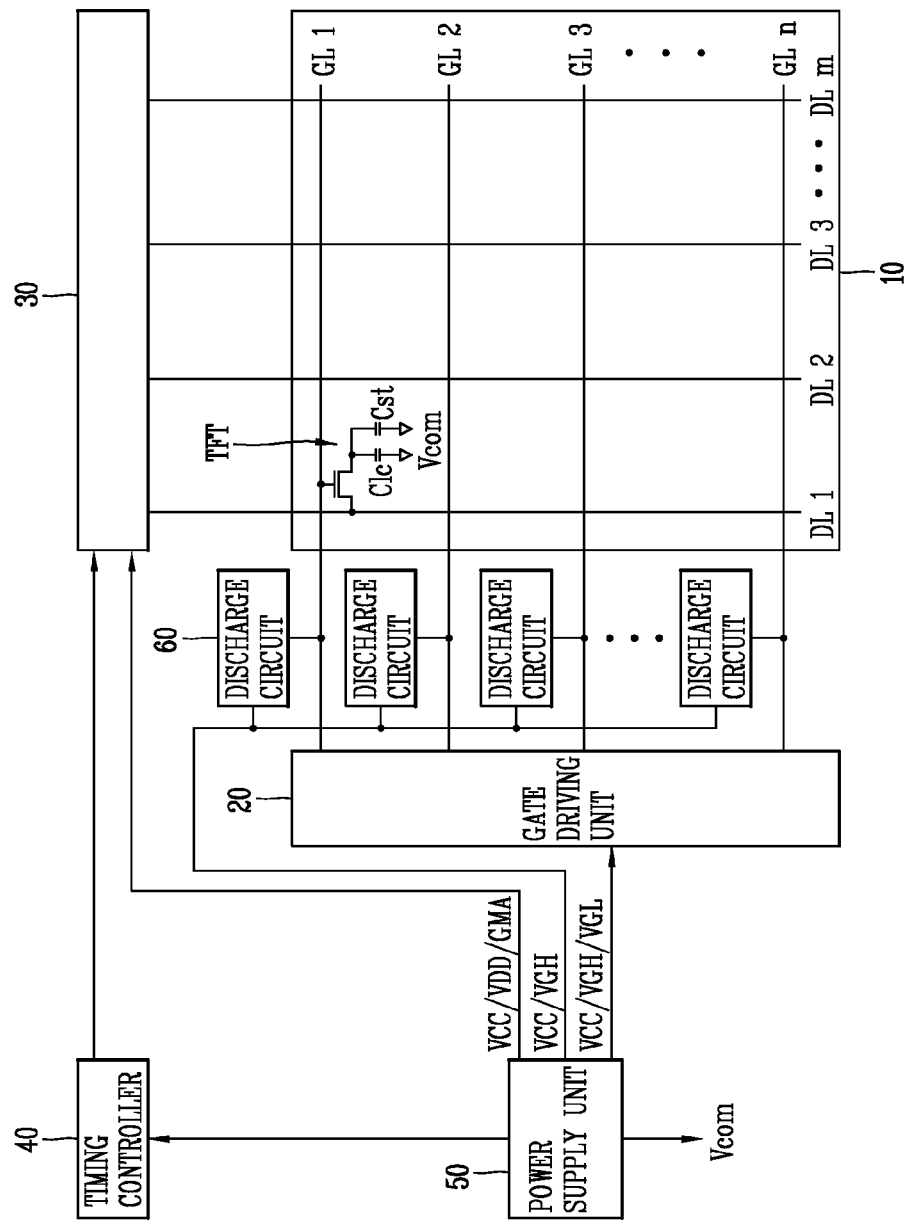
FIG. 1 is a schematic block diagram illustrating a liquid crystal display device.

Hereinafter, a liquid crystal display device and a method of driving the same according to an embodiment of the present invention will be described in more detail with reference to the accompanying drawings.

Even in different embodiments according to the present disclosure, the same or similar reference numerals are designated to the same or similar configurations, and the description thereof will be substituted by the earlier description.

Unless clearly used otherwise, expressions in the singular number used in the present disclosure may include a plural meaning.

Furthermore, it should be considered that constituent elements in the drawings attached to the specification might be illustrated in an enlarged or reduced manner for the sake of convenience of explanation.

Figure 2:
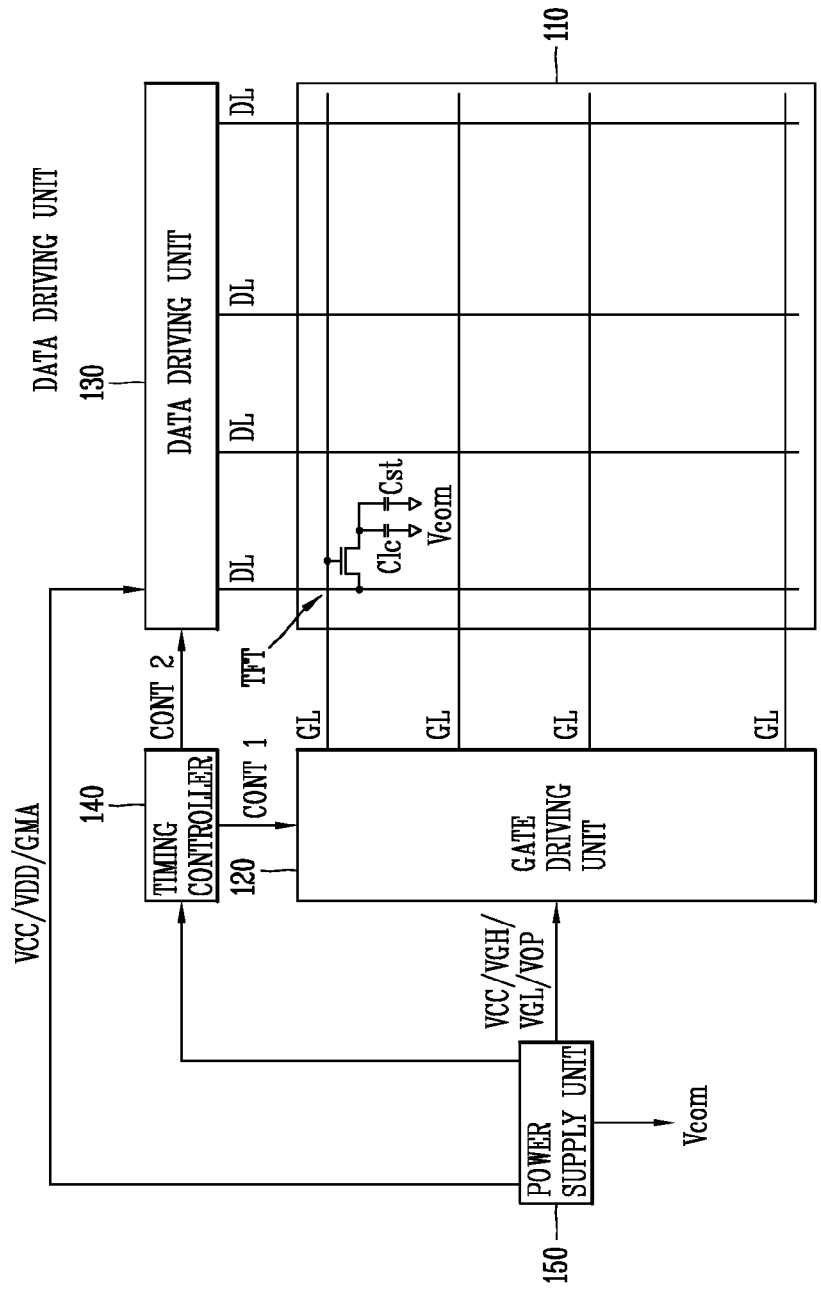
FIG. 2 is a schematic block diagram illustrating a liquid crystal display device according to a first embodiment of the present invention.

FIG. 2 is a schematic block diagram illustrating a liquid crystal display device according to a first embodiment of the present invention. A liquid crystal display device according to a first embodiment of the present invention may include a liquid crystal display panel 110, a power supply unit 150, a timing controller 140, a gate driving unit 120 and a data driving unit 130.

The liquid crystal display panel 110 may include a plurality of gate lines (GLs) and a plurality of data lines (DLs), and a plurality of unit pixels arranged in a matrix form defined by the plurality of gate lines (GLs) and data lines (DLs) intersecting with each other.

The each unit pixel may include a switching element (TFT) connected to the gate line (GL) and the data line (DL). In case of the liquid crystal display device, the device may include a liquid crystal capacitor (Clc) and a storage capacitor (Cst) connected to the switching element (TFT).

The switching element (TFT) may be provided in a TFT substrate, and as a three-terminal element, a gate electrode thereof is connected to the gate line (GL), and a source electrode thereof is connected to the data line (DL), and a drain electrode thereof is connected to the liquid crystal capacitor (Clc) or storage capacitor (Cst) within the unit pixel.

The power supply unit 150 may generate a plurality of driving voltages for driving the liquid crystal display panel 110, timing controller 140, gate driving unit 120 and data driving unit 130. In particular, the power supply unit 150 may supply the power voltage (VCC), gate-on voltage (VGH), gate-off voltage (VGL) and reference voltage (VOP) to the gate driving unit 120, and supply the power voltage (VCC), driving voltage (VDD) and gamma voltage (GMA) to the data driving unit 130, and supply the common voltage (Vcom) to the liquid crystal display panel 110.

The timing controller 140 receives an image signal and control signals for controlling the display thereof, for example, a vertical synchronization signal (Vsync), a horizontal synchronization signal (Hsync), a main clock (MCLK), a data enable signal (DE), and the like, from an external graphic controller (not shown). The timing controller 140 may generate and provide a gate control signal (CONT1), a data control signal (CONT2), and the like based on the provided control signals o the gate driving unit 120 and data driving unit 130.

Here, the gate control signal (CONT1) may include a gate start pulse (GSP) indicating a start of outputting a gate-on pulse (gate-on voltage interval), a gate shift clock signal (GSC) for controlling the output timing of a gate-on pulse, a gate output enable signal (GOE) for limiting the width of a gate-on pulse, and the like.

The data control signal (CONT2) may include image data, a source start pulse (SSP) indicating a start of providing the image data, a source output enable signal (SOE) for applying the relevant data voltage to the data line (DL), a reverse signal (RVS) for reversing the polarity of the data voltage, a data clock signal (HCLK), and the like.

The gate driving unit 120 is connected to the gate line (GL) of the liquid crystal display panel 110 to apply a gate voltage comprised of a combination of the gate-on voltage (VGH) and gate-off voltage (VGL) to the gate line (GL).

The data driving unit 130 is connected to the data line (DL) of the liquid crystal display panel 110, and generates a plurality of gradation voltages based on a plurality of gamma voltages (GMA), and selects the generated gradation voltage to apply the data voltage to the unit pixel.

At this time, the gate driving unit 120 may include a circuit (not shown) for discharging residual charge within the liquid crystal display panel 110 during the turn-off of the liquid crystal display panel 110. Accordingly, when the liquid crystal display panel 110 is turned off, the circuit (not shown) applies a gate-on voltage to the gate line (GL) of the liquid crystal display panel 110 to turn on the switching element within the liquid crystal display panel 110, thereby discharging residual charge stored in a plurality of pixels.

Furthermore, when the liquid crystal display panel 110 is turned on, the gate driving unit 120 may include a discharge circuit (not shown) for discharging residual charge remaining in each unit pixel and the gate line (GL). Hereinafter, the configuration of the gate driving unit 120 will be described in more detail.

Figure 3:
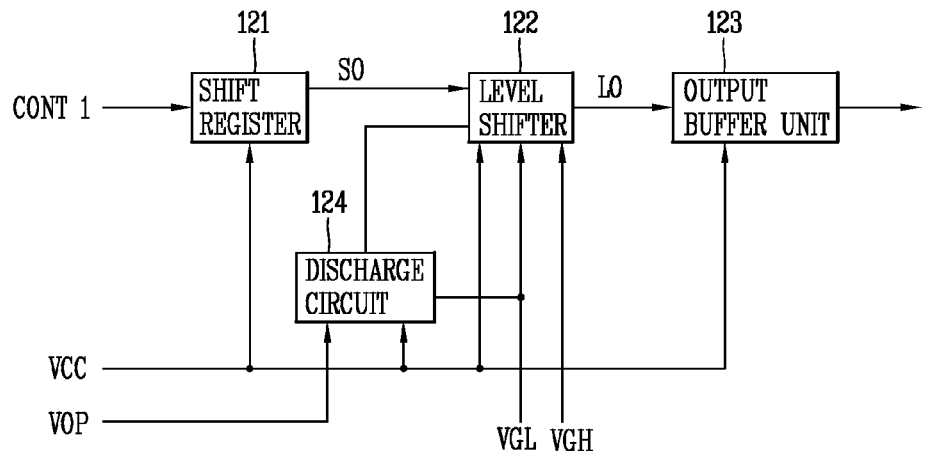
FIG. 3 is a block diagram illustrating a gate driving unit according to a first embodiment of the present invention.
Figure 4:
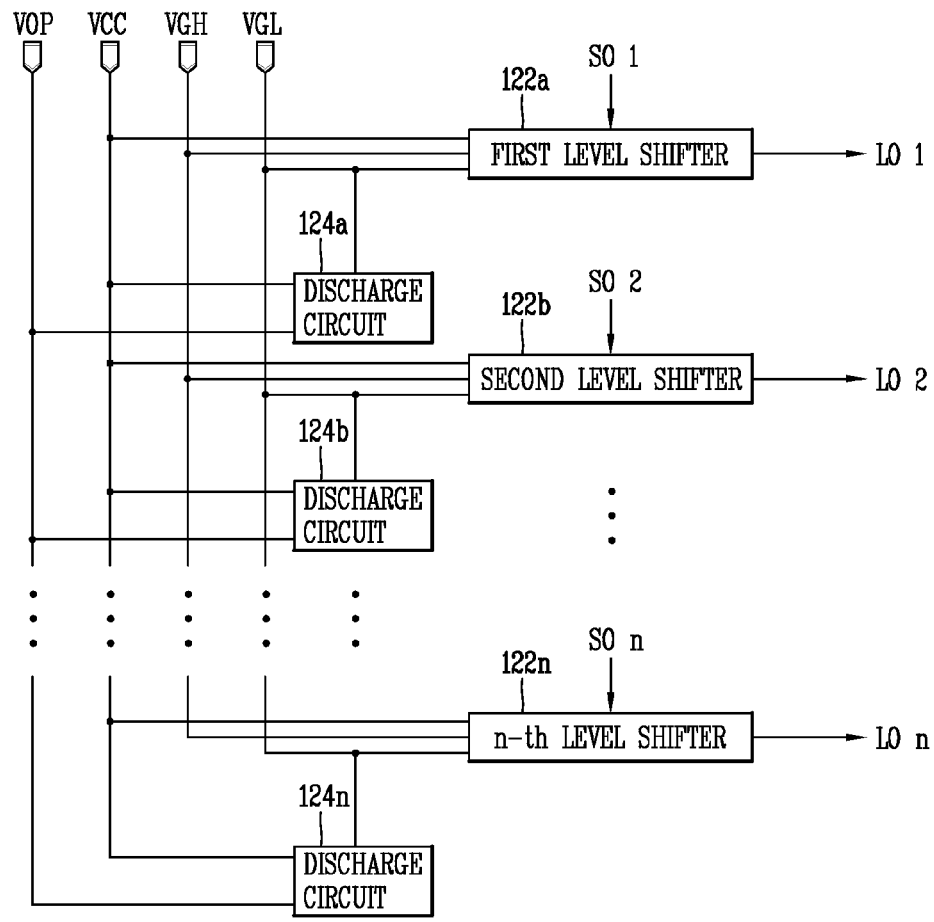
FIG. 4 is a block diagram illustrating a level shifter and a discharge circuit according to a first embodiment of the present invention.

FIG. 3 is a block diagram illustrating a gate driving unit according to a first embodiment of the present invention, and FIG. 4 is a block diagram illustrating a level shifter and a discharge circuit according to a first embodiment of the present invention.

The gate driving unit according to a first embodiment of the present invention may include a shift register 121, a level shifter 122, an output buffer unit 123, and a discharge circuit 124.

The shift register 121 receives a plurality of gate shift clock signals (GSCs) and a gate start pulses (GSP) among the gate control signals (CONT1) to shift the gate start pulse (GSP), thereby outputting a sequentially shifted gate driving voltage (SO). The gate driving voltage (SO) may include a first driving voltage at a high level and a second driving voltage at a low level.

The level shifter 122 enhances the swing voltage of the gate driving voltage (SO) to supply the gate voltage (LO) to each of the gate lines.

The level shifter 122 is connected to a gate-on voltage terminal, a gate-off voltage terminal, a power voltage terminal, and a shift register 121 output terminal and driven by the power voltage (VCC), and receives the gate-on voltage (VGH), gate-off voltage (VGL) and gate driving voltage (SO). The level shifter 122 outputs the gate-on voltage (VGH) when a first driving voltage is input to the level shifter 122 and outputs the gate-off voltage (VGL) when a second driving voltage is input thereto. The gate-on voltage (VGH) is about 25 V and the potential thereof may be higher than that of the first driving voltage, and the gate-off voltage (VGL) is about −5 V and the potential thereof may be lower than that of the second driving voltage.

Furthermore, the level shifter 122 is configured with a plurality of stages 122a-122n, where each stage corresponds to one gate line.

The output buffer unit 123 attenuates and sends the gate voltage (LO) to the gate line to minimize the effect of a gate line load. The output buffer unit 123 may be configured with a buffer circuit (not shown) containing an operational amplifier (not shown) having a voltage gain value of 1.

On the other hand, the discharge circuit 124 may be connected to the level shifter 122 to discharge the residual charge of the liquid crystal display panel. The residual charge may be a residual charge stored in a plurality of pixels within the liquid crystal display panel, and may be discharged through a path connecting the gate line and level shifter 122 with the discharge circuit 124 when turning on the liquid crystal display panel.

The discharge circuit 124 may be connected to a gate-off voltage terminal, a power voltage terminal, and a reference voltage terminal to receive the gate-off voltage (VGL), power voltage (VCC), and reference voltage (VOP).

Furthermore, the discharge circuit 124 may be configured with a plurality of stages 124a-124n one of which is disposed for each level shifter 122.

Hereinafter, the detailed configuration of the discharge circuit 124 will be described with reference to other drawings.

Figure 5:
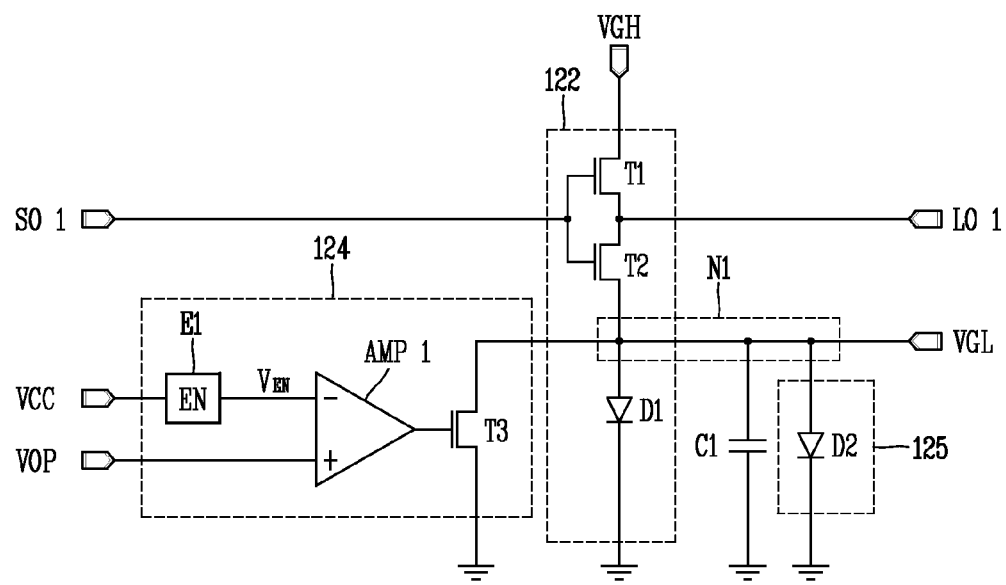
FIG. 5 is a circuit diagram illustrating the discharge circuit and level shifter according to a first embodiment of the present invention.
Figure 6:
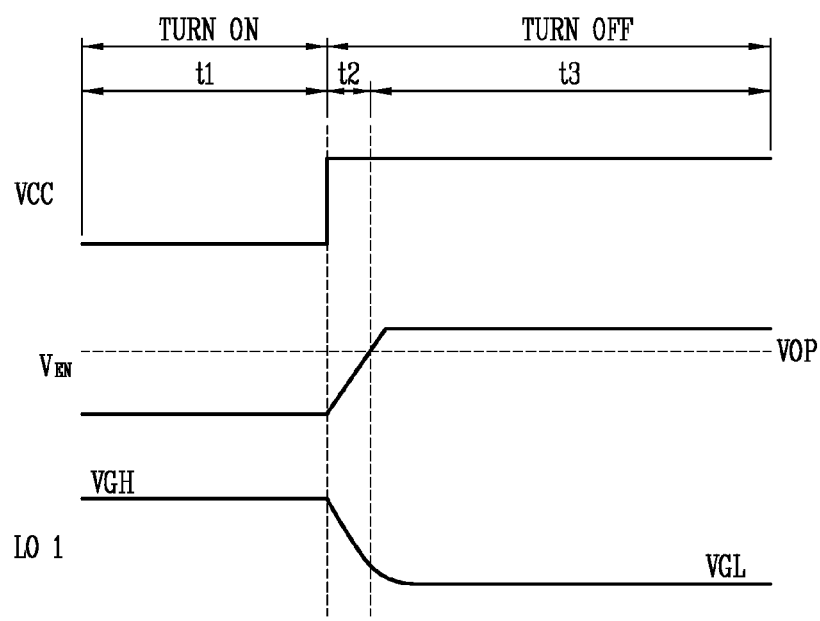
FIG. 6 is a graph illustrating a power voltage, an enable signal, a gate voltage according to a first embodiment of the present invention.

FIG. 5 is a circuit diagram illustrating the discharge circuit and level shifter according to a first embodiment of the present invention, and FIG. 6 is a graph illustrating a power voltage (VCC), an enable signal, a gate voltage according to a first embodiment of the present invention.

The level shifter 122 according to a first embodiment of the present invention may include a first transistor (T1), a second transistor (T2), and a first diode (D1) connected in series. The gate electrode of the first transistor (T1) is connected to an output terminal of the shift register, and a source electrode of the first transistor (T1) is connected to the gate-on voltage terminal, and a drain electrode of the first transistor (T1) is connected to the liquid crystal display panel 110. The first transistor (T1) may be formed with an n-channel MOS (NMOS) device. Furthermore, the first transistor (T1) may be turned on by the first driving voltage to form a first current path in which the gate-on voltage (VGH) is applied to the liquid crystal display panel.

A gate electrode of the second transistor (T2) may be connected to an output terminal of the shift register, and a source electrode of the second transistor (T2) may be connected to the gate-off voltage terminal through a first node (N1), and a drain electrode of the second transistor (T2) may be connected to the liquid crystal display panel. The second transistor (T2) may be formed with a p-channel MOS (PMOS) device. Furthermore, the second transistor (T2) may be turned on by the second driving voltage to form a second current path in which the gate-off voltage (VGL) is applied to the liquid crystal display panel.

The first diode (D1) is an anti-static diode. The anode electrode of the first diode (D1) may be connected to the first node (N1) and the cathode electrode of the first diode (D1) may be connected to the ground terminal. In one embodiment, the turn-on voltage of the first diode (D1) is about 0.8 V.

Accordingly, the level shifter 122 selectively turns on or off the first transistor (T1) and second transistor (T2) based on the gate driving voltage (SO), thereby outputting a voltage having the same waveform as the gate driving voltage (SO) while outputting the gate voltage (LO) with a changed swing level.

On the other hand, the discharge circuit 124 according to a first embodiment of the present invention may include an enable signal generator (E1), a comparator (AMP1), and a third transistor (T3).

The enable signal generator (E1) receives the power voltage (VCC) and outputs an enable signal ($V_{EN}$). The power voltage (VCC) is a voltage raised to a high-level potential at an instant when turned on as illustrated in FIG. 6. The enable signal ($V_{EN}$) is a voltage linearly increased at an instant when turned on. The enable signal ($V_{EN}$) may be raised to a potential higher than the potential of the reference voltage and then maintained at a constant potential.

Furthermore, the enable signal generator (E1) is configured with an integrator to integrate the power voltage (VCC) for a predetermined period of time to make a linearly increased waveform. However, the enable signal generator (E1) is not limited to this, and any circuit may be used if it is a circuit capable of outputting a linearly increased voltage.

The comparator (AMP1) compares the potential of the enable signal ($V_{EN}$) with that of the reference voltage to output a logical value "1" when the potential of the enable signal ($V_{EN}$) is lower than that of the reference voltage, and output a logical value "0" when the potential of the enable signal ($V_{EN}$) is higher than that of the reference voltage.

Furthermore, the comparator (AMP1) may be configured with a differential amplifier in which an inverting terminal thereof is connected to an output terminal of the enable signal generator (E1), a non-inverting terminal thereof is connected to the reference voltage terminal, and an output terminal thereof is connected to a gate electrode of the third transistor (T3).

The gate electrode of the third transistor (T3) may be connected to an output terminal of the comparator (AMP1), the source electrode of the third transistor (T3) may be connected to the first node (N1), and the drain electrode of the third transistor (T3) may be connected to the ground terminal. The third transistor (T3) may conduct a path between the first node (N1) and the ground terminal when a logical value "1"

is input to the gate electrode, and open a path between the first node (N1) and the ground terminal when a logical value "0" is input to the gate electrode.

Accordingly, the discharge circuit 124 may selectively conduct the first discharge path (not shown) for connecting between the first node (N1) and the ground terminal. The first node (N1) is connected to a source electrode of the second transistor (T2), and thus the first discharge path may be connected to a gate line of the liquid crystal display panel through the second current path. Therefore, the residual charge of the liquid crystal display panel may be discharged through the first discharge path.

On the other hand, an auxiliary discharge circuit 125 may be formed outside the discharge circuit 124 and level shifter 122. The auxiliary discharge circuit 125 is connected between the first node (N1) and the ground terminal, and may be configured with a second diode (D2) connected to the capacitor (C1) in parallel. An anode electrode of the second diode (D2) may be connected to the first node (N1) and a cathode electrode thereof may be connected to the ground terminal. The auxiliary discharge circuit 125 may form a second discharge path.

In this case, the capacitor (C1) is connected to a gate-off voltage terminal through the first node (N1), and disposed to stably apply the gate-off voltage (VGL) without ripple to the liquid crystal display panel.

However, residual charge may be filled into the capacitor (C1) when turning on the liquid crystal display panel to increase a potential difference of the capacitor (C1), and thus the first diode (D1) is turned on to leak the residual charge through a path disposed with the first diode (D1), thereby causing a short circuit.

Accordingly, the second diode (D2) forms an auxiliary discharge path capable of discharging residual charge as well as has a turn-on voltage less than the turn-on voltage of the first diode (D1), and thus the residual charge is not leaked to the first diode (D1), thereby allowing the first diode (D1) to be stably operated. The turn-on voltage of the first diode (D1) may be 0.8 V, and the turn-on voltage of the second diode (D2) may be 0.3 V. As a result, the gate-off voltage (VGL) may not be raised above 0.3 V by the second diode (D2), thereby securing a stable operation of the gate-off voltage (VGL).

On the other hand, it is illustrated in the drawing that the discharge circuit 124 is disposed outside the level shifter 122, but an embodiment of the present invention may include a case that the discharge circuit 124 is disposed within the level shifter 122.

Hereinafter, the operation of a discharge circuit according to a first embodiment of the present invention will be described with reference to FIGS. 7A and 7B.

Figure 7A:
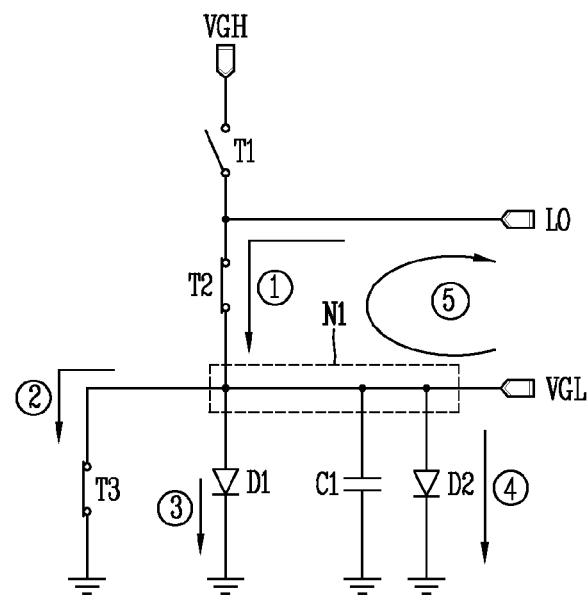
FIG. 7A is an operation circuit diagram during the interval t2 after turned on at the discharge circuit and level shifter according to a first embodiment of the present invention.
Figure 7B:
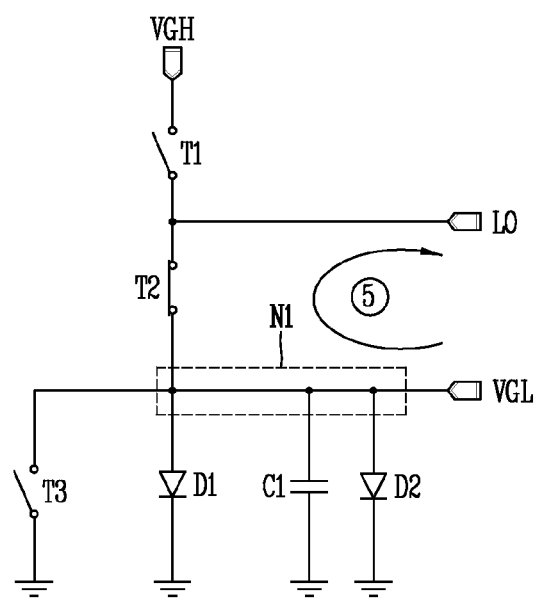
FIG. 7B is an operation circuit diagram during the interval t3 after turned on at the discharge circuit and level shifter according to a first embodiment of the present invention.

FIG. 7A is an operation circuit diagram during the interval t2 after turned on at the discharge circuit and level shifter according to a first embodiment of the present invention, and FIG. 7B is an operation circuit diagram during the interval t3 after turned on at the discharge circuit and level shifter according to a first embodiment of the present invention.

First, referring to FIG. 6, the interval t1 is an interval during which the liquid crystal display panel is turned off, and the intervals t2 and t3 are intervals during which the liquid crystal display panel is turn on. At this time, the power voltage (VCC) is a low level during the interval t1 and the enable signal is also a low level, and the gate voltage (LO) is a gate-on voltage (VGH). In other words, during the interval t1, the power voltage (VCC) is not applied to the liquid crystal display panel and gate driving unit, and thus the level shift and discharge circuit are not operated, but only a circuit (not shown) for applying the gate-on voltage (VGH) to the liquid crystal display panel is operated. Accordingly, the switching element of the liquid crystal display panel is turned on, and residual charge may be discharged to the data line through the switching element, but part of the residual charge that has not been discharged may remain in a state of being stored in the liquid crystal display panel.

Subsequently, during the interval t2, the power voltage (VCC) is boosted to a high level, and thus the enable signal ($V_{EN}$) also starts to be linearly increased. At this time, the second driving voltage at a low level is output to the shift register, and thus as illustrated in FIG. 7A, the first transistor (T1) is turned off and the second transistor (T2) is turned on. Accordingly, a first current path connecting the gate-on voltage terminal and output terminal is open, and a second current path connecting the gate-off voltage and output terminal is conducted.

At this time, the gate-off voltage (VGL) is applied to a gate line of the liquid crystal display panel through the second current path. In FIG. 7A, a path in which the gate-off voltage (VGL) is applied to the liquid crystal display panel is path (5). Therefore, as illustrated in FIG. 6, the gate voltage (LO) starts to drop down to a potential of the gate-off voltage (VGL) from the time point t1. However, since the gate voltage (LO) is an analog voltage, it drops down with an arbitrary slope value for a predetermined period of time.

On the other hand, the enable signal ($V_{EN}$) starts to linearly increase while at the same time the liquid crystal display device is turned on, but the voltage level is lower than the reference voltage (VOP) during the interval t1. Here, the reference voltage (VOP) is 1 or 1.8 V. Accordingly, the comparator outputs a logical value "1", and thus the third transistor (T3) is turned on. Therefore, the discharge circuit forms a first discharge path connecting the first node (N1) and the ground terminal.

At this time, the residual charge of the liquid crystal display panel may be passed through the second current path and discharged through the first discharge path. In other words, the residual charge may be discharged through the paths (1) and (2) as illustrated in FIG. 7A.

Furthermore, the second diode (D2) may form a second discharge path connecting the first node (N1) and the ground terminal. However, the turn-on voltage of the second diode (D2) is about 0.3 V, and thus the second discharge path may be conducted when the voltage of the first node (N1) is above about 0.3 V. The residual charge may be discharged through the paths (1) and (4).

On the other hand, the first diode (D1) may also form a third discharge path connecting the first node (N1) and the ground terminal. However, the turn-on voltage of the first diode (D1) is about 0.8 V, and thus the third discharge path may be conducted when the voltage of the first node (N1) is above about 0.8 V. At this time, the residual charge may be discharged through the paths (1) and (3). In this manner, the residual charge may be discharged through the first discharge path, and the second and the third discharge path may also form auxiliary discharge paths to effectively discharge the residual charge. Therefore, as illustrated in FIG. 6, the gate voltage (LO) has a stable gate-off voltage (VGL) without increasing the potential.

Then, during the interval t3, the power voltage (VCC) maintains a high level, and the enable signal ($V_{EN}$) continues to be raised and then maintain a predetermined potential when reaching the predetermined potential. In this case, referring to FIG. 7B, the level shifter receives the second driving voltage at a low level as in case of the interval t2, and thus the first transistor (T1) is turned off and the second transistor (T2) is turned on to conduct only the second current path. Accordingly, the gate-off voltage (VGL) continues to be applied to the liquid crystal display panel through the path (5).

Then, the potential of the enable signal ($V_{EN}$) becomes higher than that of the reference voltage. Accordingly, the comparator outputs a logical value "0", and the third transistor (T3) that has received the logical value "0" is turned off. Therefore, the first discharge path is open.

On the other hand, the voltage of the first node (N1) is lower than the turn-on voltage of the first diode (D1) and second diode (D2), and thus the first diode (D1) and second diode (D2) are in a turn-off state and the second and the third discharge path are also open.

Accordingly, the residual charge is not discharged through the first and the second, and third discharge path.

In summary, the residual charge of the liquid crystal display panel is discharged through three discharge paths during the interval t2, and thus when the residual charge is charged in the capacitor (C1) and the residual charge being charged is increased, it will not occur a case where the current is leaked through a route connected to the capacitor (C1) in parallel. Accordingly, a short phenomenon due to leakage current does not occur, and thus the gate-off voltage (VGL) may be stably applied to the liquid crystal display panel. As a result, it may be possible to remove the phenomenon of screen display failure that has occurred when turning on the liquid crystal display device.

Hereinafter, a discharge circuit according to a second embodiment of the present invention will be described in detail.

Figure 8:
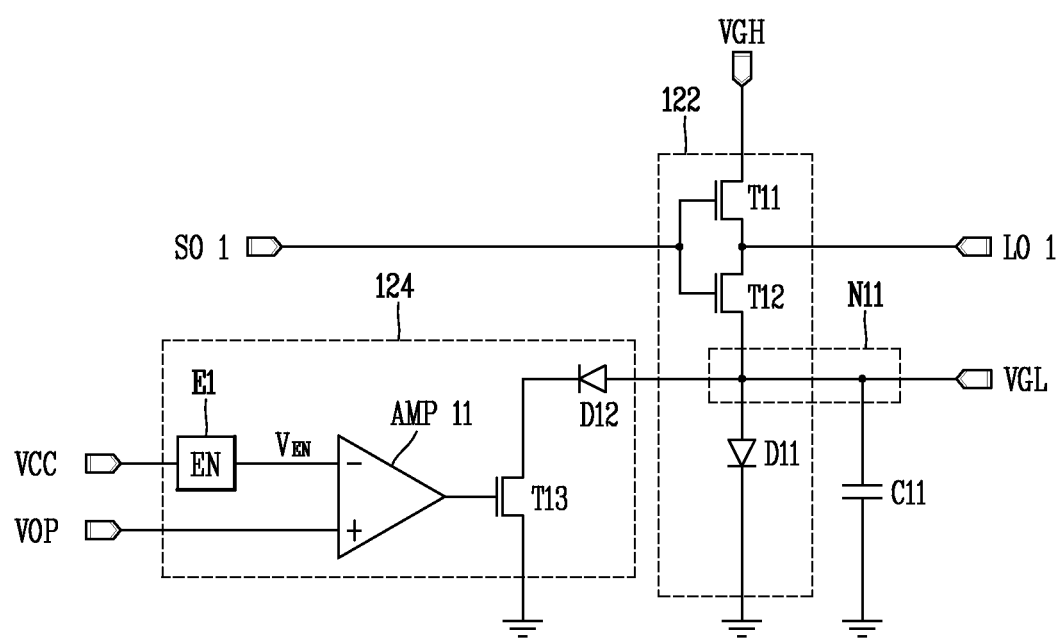
FIG. 8 is a circuit diagram illustrating the discharge circuit and level shifter according to a second embodiment of the present invention.

FIG. 8 is a circuit diagram illustrating the discharge circuit and level shifter according to a second embodiment of the present invention. A liquid crystal display device according to a second embodiment of the present invention does not include an auxiliary discharge circuit, and the remaining configuration thereof is the same as that of the first embodiment of the present invention, and the description thereof is substituted by the description of the first embodiment.

The level shifter 222 according to a second embodiment of the present invention may include a first transistor (T11), a second transistor (T12), and a first diode (D 11). Similar to the first embodiment, the first transistor (T11) may form a first current path in which the gate-on voltage (VGH) is applied to the liquid crystal display panel, and the second transistor (T12) may form a second current path in which the gate-off voltage (VGL) is applied to the liquid crystal display panel, and the turn-on voltage of the first diode (D11) may be 0.8 V as an anti-static diode.

On the other hand, the discharge circuit 224 according to a second embodiment of the present invention may include an enable signal generator (Ell), a comparator (AMP11), a third transistor (T13), and a second diode (D12). The enable signal generator (E11), comparator (AMP11), and third transistor (T13) are the same as the configuration according to the first embodiment of the present invention, and perform the same operation, and thus the description thereof is substituted by the description of the first embodiment.

Hereinafter, the second diode (D12) will be described in detail. The second diode (D12) may be disposed at a first discharge path connecting the first node (N11) and the ground terminal. Specifically, an anode electrode of the second diode (D12) may be connected to the first node (N11), and a cathode electrode thereof to the third transistor (T13). The turn-on voltage of the second diode (D12) may be 0.3 V.

When the liquid crystal display device is turned on and then the potential of the first node (N11) is above 0.3 V, the residual charge may be discharged through the first discharge path, but when the potential of the first node (N11) is less than 0.3 V, the residual charge may be charged in the capacitor (C11). When the residual charge charged in the capacitor (C11) is increased, the potential at both ends of the capacitor (C11) may be raised, and the potential of the first node (N11) may be raised. At this time, when the potential of the first node (N11) is higher than the turn-on voltage of the first diode (D11) and second diode (D12), the first diode (D11) and second diode (D12) may be turned on. However, the turn-on voltage of the second diode (D12) is lower, and thus the residual charge is discharged through the turned-on second diode (D12) prior to turning on the first diode (D11), and thus the voltage of the first node (N11) is unable to be raised above 0.3 V.

Therefore, the second diode (D12) may suppress the potential of the gate-off voltage (VGL) under 0.3 V, thereby securing a stable operation of the switching element of the liquid crystal display panel.

An operation voltage according to a second embodiment of the present invention has the same form as that of the first embodiment, and thus the operation according to a second embodiment of the present invention will be described below with reference to FIGS. 6, 9A and 9B.

Figure 9A:
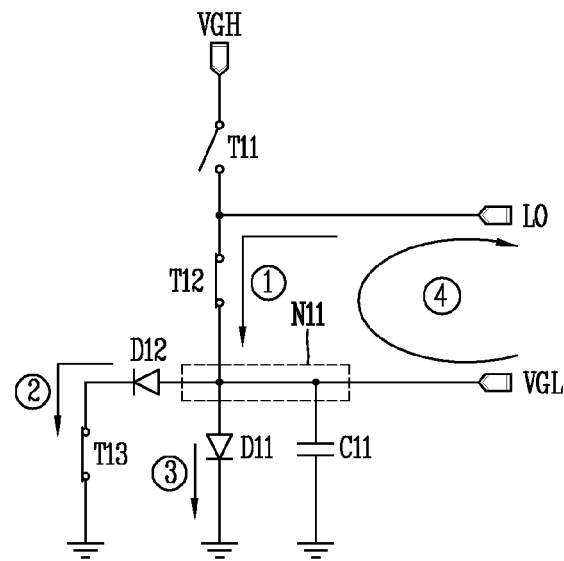
FIG. 9A is an operation circuit diagram during the interval t2 after turned on at the discharge circuit and level shifter according to a second embodiment of the present invention.
Figure 9B:
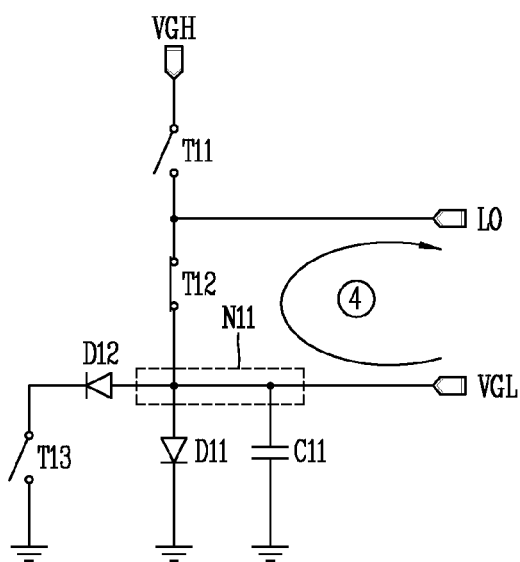
FIG. 9B is an operation circuit diagram during the interval t3 after turned on at the discharge circuit and level shifter according to a second embodiment of the present invention.

FIG. 9A is an operation circuit diagram during the interval t2 after turned on at the discharge circuit and level shifter according to a second embodiment of the present invention, and FIG. 9B is an operation circuit diagram during the interval t3 after turned on at the discharge circuit and level shifter according to a second embodiment of the present invention. The interval t1 is an interval in which the liquid crystal display device is turned off, and the discharge circuit is not operated and the first transistor (T11) of the level shifter is turned on, and thus the gate-on voltage (VGH) is applied to the liquid crystal display panel through the first current path.

The interval t2 is an interval in which the liquid crystal display device starts to be turned on, and will be described with reference to FIG. 9A. At an instant when the liquid crystal display device is turned on, the first transistor (T11) is turned off, and the second transistor (T12) is turned on. In other words, a first current path connecting the gate-on voltage terminal and the output terminal is open, and a second current path connecting the gate-off voltage terminal and the output terminal is conducted. Accordingly, the gate-off voltage (VGL) is applied to the liquid crystal display panel through the second current path. The path through which the gate-off voltage (VGL) is applied to the liquid crystal display panel is path (4).

On the other hand, the voltage level of the enable signal starts to linearly increase but it stays lower than that of the reference voltage (VOP). The reference voltage (VOP) is 1 or 1.8 V. Accordingly, the comparator outputs a logical value "1" and thus the third transistor (T13) is turned on. Therefore, the discharge circuit forms a first discharge path connecting the first node (N11) and the ground terminal. At this time, the residual charge of the liquid crystal display panel passes through the second current path to be discharged through the first discharge path. In other words, the residual charge may be discharged through the paths (1) and (2).

Then, the first diode (D11) also forms a second discharge path connecting the first node (N11) and the ground terminal. Accordingly, the residual charge may be discharged through the paths (1) and (3).

On the other hand, when residual charge is charged to the capacitor (C11), the residual charge being charged may be increased to increase the voltage of the first node (N11) based on an increase of voltage at both ends of the capacitor (C11). However, when the first node (N11) becomes 0.3 V, the second diode (D12) is turned on and thus the residual charge is discharged through the second diode (D12), and therefore, the first diode (D11) is not turned on. Furthermore, the potential of the first node (N11) is not raised above 0.3 V, and thus the gate-off voltage (VGL) is not also raised above 0.3 V.

The interval t3 is an interval in which the liquid crystal display device is turned on subsequent to the interval t2, and will be described with reference to FIG. 9B. Similar to a case of the interval t2, the first transistor (T11) is turned off and the second transistor (T12) is turned on and thus only the second current path is conducted.

Then, the potential of the enable signal is higher than that of the reference voltage. Accordingly, the comparator outputs a logical value "0" to the output terminal, and the third transistor (T13) that has received the logical value "0" is turned off. Therefore, the first discharge path is open. Furthermore, the voltage of the first node (N11) becomes the same as that of the gate-off voltage (VGL), and thus is lower than the turn-on voltage of the first diode (D11), and the first diode (D11) is not turned on. As a result, the residual charge is not discharged through the second discharge path. Accordingly, the gate-off voltage (VGL) has a low level voltage as illustrated in FIG. 6, and may be stably applied to the liquid crystal display panel.

Figure 10:
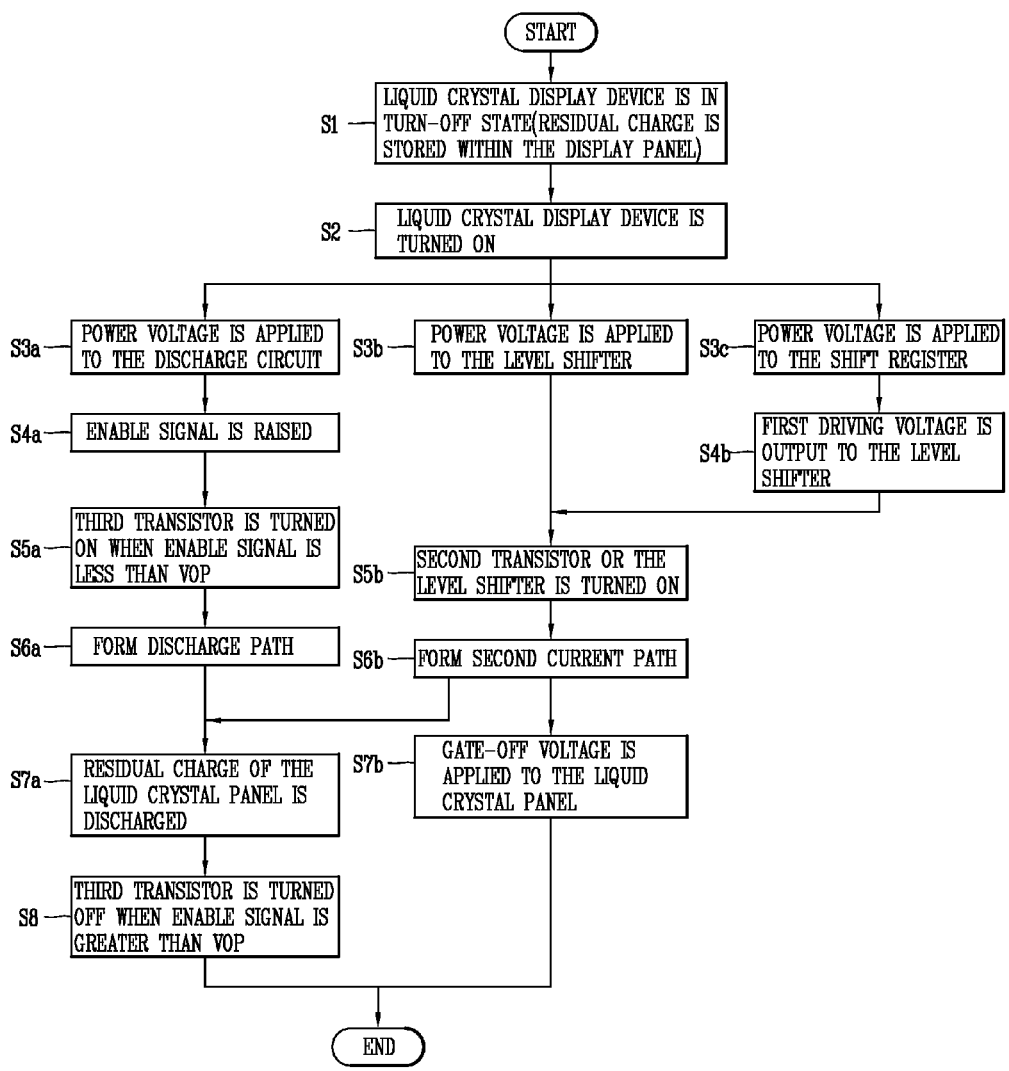
FIG. 10 is a flow chart illustrating a method of driving a liquid crystal display device according to a third embodiment of the present invention.

Hereinafter, a method of driving a liquid crystal display device according to a third embodiment of the present invention will be described. FIG. 10 is a flow chart illustrating a method of driving a liquid crystal display device according to a third embodiment of the present invention.

First, the liquid crystal display device is set to a turn-off state (S1). At this time, the gate-on voltage is applied to the gate line of the liquid crystal display panel, and thus the thin-film transistor (TFT) is in a turned-on state, and residual charge is stored in a plurality of pixels.

Then, the liquid crystal display device is turned on (S2). At this time, the power supply unit is operated, and the power supply unit applies a power voltage to the discharge circuit to drive the discharge circuit (S3a), and applies a power voltage to the level shifter to drive the level shifter (S3b), and applies a power voltage to the shift register to drive the shift register (S3c).

Then, the shift register outputs a first driving voltage to the level shifter (Sb). The first driving voltage is a low level voltage.

Subsequently, the second transistor of the level shifter that has received the first driving voltage is turned on (S5b). The second transistor is connected between the gate-off voltage terminal and the output terminal, and the output terminal is connected to a gate line of the liquid crystal display panel.

Accordingly, a second current path applying the gate-off voltage to the liquid crystal display panel is formed (S6b).

On the other hand, in the discharge circuit, the enable signal generator may receive the power voltage to generate an enable signal (S4a). The enable signal is a linearly increased waveform along with the input of the power voltage.

At this time, the enable signal and reference voltage are input to the comparator, and since the enable signal is less than the reference voltage, the comparator outputs a first control signal, namely, a logical value "1", to turn on the third transistor (S5a).

A discharge path connecting the ground terminal and gate-off voltage may be formed by the turn-on of the third transistor (S6a).

Subsequently, the residual charge of the liquid crystal display panel is discharged through the discharge path and second current path (S7a).

At the same time, the gate-off voltage may be applied to the liquid crystal display panel through the second current path (S7b).

On the other hand, after a predetermined period of time has passed, the enable signal becomes greater than the reference voltage, and the third transistor is turned off through the comparator (S8). At this time, the comparator outputs a second control signal, namely, a logical value "0", to the third transistor and accordingly, the third transistor is turned off to open the discharge path.

As described above, subsequent to turning on the liquid crystal display device, a discharge path connecting the gate-off voltage terminal and the ground terminal is temporarily conducted to discharge the residual charge, and thus the gate-off voltage being output from the gate-off voltage terminal may be stably applied to the liquid crystal display panel.

On the other hand, according to the embodiments of the present invention, it is described that the level shifter is operated by receiving an output of the shift register, but the present invention is characterized in a discharge circuit, and thus an embodiment of the present invention may include a case in which the level shifter is operated by receiving a control signal from the timing controller or an external circuit.

Furthermore, the embodiments of the present invention have been restricted to a liquid crystal display device, but may also be applied to a case such as an organic light emitting display device, an electrophoretic display device, a plasma display device, and the like.

Although the preferred embodiments of the present invention have been described in detail, it should be understood by those skilled in the art that various modifications and other equivalent embodiments thereof can be made.

Consequently, the rights scope of the present invention is not limited to the embodiments and various modifications and improvements thereto made by those skilled in the art using the basic concept of the present invention as defined in the accompanying claims will fall in the rights scope of the invention.

What is claimed is:

1. A liquid crystal display device, comprising:
   a liquid crystal display panel comprising a plurality of pixels defined by a plurality of gate lines and a plurality of data lines intersecting with each other and switching elements for driving the plurality of pixels;
   a level shifter comprising a first transistor connected between a gate-on voltage terminal and an output terminal and a second transistor connected between a gate-off voltage terminal and the output terminal to selectively output either gate-on voltage or gate-off voltage to the plurality of gate lines; and
   a discharge circuit connected between the second transistor and a ground terminal so as to conduct a first discharge path,
   wherein the discharge circuit comprises:
   a third transistor provided between the gate-off voltage terminal and the ground terminal;
   an enable signal generator comprising an integrator to receive a power voltage applied so as to generate an enable signal, which linearly increases in response to an increase in the power voltage; and
   a comparator configured to turn on or off the third transistor by comparing the enable signal with a reference voltage.

2. The liquid crystal display device of claim 1, wherein the residual charge is a charge stored in the plurality of pixels and the gate line during the power-off of the liquid crystal display panel.

3. The liquid crystal display device of claim 1, wherein the discharge circuit compares an enable signal having potential that linearly increases from a time when the liquid crystal display panel is powered on with a reference voltage, and conducts the first discharge path to discharge residual charge when the potential of the enable signal is lower than the potential of the reference voltage, and opens the first discharge path when the potential of the enable signal is higher than the potential of the reference voltage.

4. The liquid crystal display device of claim 3, wherein the discharge circuit comprises:
the comparator configured to receive the enable signal and the reference voltage to output an active logical value when the potential of the enable signal is lower than the potential of the reference voltage and output an inactive logical value when the potential of the enable signal is higher than the potential of the reference voltage; and
the third transistor configured to conduct the first discharge path upon receiving the active logical value and open the first discharge path upon receiving the inactive logical value.

5. The liquid crystal display device of claim 4, wherein the comparator is configured with a differential amplifier to receive the enable signal at a non-inverting terminal thereof and receive the reference voltage at an inverting terminal thereof, and output a logical value to the third transistor.

6. The liquid crystal display device of claim 4, wherein the third transistor has a gate electrode connected to an output terminal of the comparator, and a source electrode connected to the gate-off voltage terminal, and a drain electrode connected to the ground terminal.

7. The liquid crystal display device of claim 4, wherein the discharge circuit further comprises a first diode connected to the third transistor in series.

8. The liquid crystal display device of claim 7, wherein the turn-on voltage of the first diode is 0.3 V.

9. The liquid crystal display device of claim 1, further comprising:
a capacitor connected between the gate-off terminal and the ground terminal.

10. The liquid crystal display device of claim 9, further comprising:
a second diode connected to the capacitor in parallel to conduct a second discharge path.

11. The liquid crystal display device of claim 1, wherein the discharge circuit is included within the level shifter.

12. A method of driving a liquid crystal display device comprising a liquid crystal display panel comprising a plurality of pixels defined by a plurality of gate lines and a plurality of data lines intersecting with each other; a level shifter comprising a first transistor connected between a gate-on voltage terminal and the gate line and a second transistor connected between a gate-off voltage terminal and the gate line; and a discharge circuit connected between the second transistor and a ground voltage terminal to conduct a first current path, the method comprising:
applying power to the liquid crystal display panel;
generating an enable signal by integrating a power voltage, the enable signal linearly increasing;
generating a first or second control signal by comparing the enable signal with a reference signal;
turning on the second transistor to conduct a current path for applying a gate-off voltage to the gate line;
conducting the first discharge path connected to the current path;
discharging the residual charge of the liquid crystal display panel through the first discharge path and the current path;
opening the first discharge path; and
applying the gate-off voltage to the liquid crystal display panel.

13. The method of claim 12, wherein said conducting the first discharge path comprises:
generating the first control signal when the potential of the enable signal is lower than that of the reference voltage; and
conducting the first discharge path based on the first control signal.

14. The method of claim 12, wherein said opening the first discharge path comprises:
generating the second control signal when the potential of the enable signal is higher than that of the reference voltage; and
opening the first discharge path based on the second control signal.

15. The method of claim 12, further comprising:
conducting a second discharge path connected to the current path and connected to the first discharge path in parallel while at the same time forming the first discharge path; and
discharging the residual charge through the second discharge path.

* * * * *